United States Patent [19]

Husaini

[11] 4,156,024

[45] May 22, 1979

[54] PROCESS FOR PREPARING A SOLUBLE TEA PRODUCT

[75] Inventor: Saeed A. Husaini, Marysville, Ohio

[73] Assignee: Societe d'Assistance Technique pour Produits Nestlé S.A., Lausanne, Switzerland

[21] Appl. No.: 811,967

[22] Filed: Jun. 30, 1977

Related U.S. Application Data

[63] Continuation of Ser. No. 667,903, Mar. 17, 1976, abandoned.

[51] Int. Cl.$^2$ .................................................. A23F 3/00
[52] U.S. Cl. ...................................... 426/257; 426/312; 426/597
[58] Field of Search ................... 426/597, 49, 52, 312, 426/253, 257

[56] References Cited

U.S. PATENT DOCUMENTS

| | | | |
|---|---|---|---|
| 2,831,772 | 4/1958 | Herz | 426/597 |
| 2,863,775 | 12/1958 | Perech | 426/597 X |
| 3,065,077 | 11/1962 | Mishkin et al. | 426/597 |
| 3,151,985 | 10/1964 | Fobes | 426/597 X |
| 3,163,539 | 12/1964 | Barch | 426/597 X |
| 3,451,823 | 6/1969 | Mishkin et al. | 426/597 |
| 3,787,590 | 1/1974 | Burders et al. | 426/597 X |
| 3,812,266 | 5/1974 | Sanderson et al. | 426/597 X |
| 3,950,553 | 4/1976 | Gasser et al. | 426/597 X |

FOREIGN PATENT DOCUMENTS

1249932 10/1971 United Kingdom ...................... 426/49

OTHER PUBLICATIONS

Condensed Chem. Dict. 8th Ed., Van Nostrand Reinhold Co., 1971.

*Primary Examiner*—Steven L. Weinstein
*Attorney, Agent, or Firm*—Watson, Leavenworth, Kelton & Taggart

[57] ABSTRACT

Raw tea tannins which are cold-water insoluble are catalytically oxidized to improve their solubility. The oxidized tannins may then be employed in tea beverage products which are more convenient and desirable.

8 Claims, No Drawings

PROCESS FOR PREPARING A SOLUBLE TEA PRODUCT

This is a continuation, of application Ser. No. 667,903, filed Mar. 17, 1976, now abandoned.

INTRODUCTION TO THE INVENTION

This invention relates to an improved process for increasing the solubility of tea products. More particularly, this process is directed to a means for improving the cold-water solubility of the tannin fraction of tea beverage compositions.

A further object of the present invention involves reduction in the amounts of reagents, and simplification of the technique, customarily utilized for increasing the solubility of tea products.

Another object of the present invention comprises the preparation of an essentially completely cold-water soluble tea product which will yield substantially the same flavor, appearance and color as freshly-brewed tea.

These, and such other objects and advantages as are described hereinafter, are achieved through the present invention.

BACKGROUND OF THE DISCLOSURE

In aqueous tea extracts, substances of varying solubilities are encountered. One fraction of the extracted solids is readily soluble in hot or cold water. The remaining fraction, referred to herein for convenience as tea "tannins", is soluble in hot water but essentially insoluble in cold water. The constituents of this second fraction are not necessarily all tannins in a chemical sense, but they behave as tannins and are customarily and collectively referred to in the art as "tannins".

This tannin fraction of tea offers no significant difficulties in the production of hot beverage. Cold and iced tea drinks containing these raw or native tannins, however, are rendered less desirable by the precipitation and cloudiness resultant from their solubility limitations. In addition, the ease and completeness with which dehydrated tea compositions may be reconstituted in water also suffers from the presence of these raw tannins.

One method of the prior art for overcoming these drawbacks of tea products comprises removing the tannin fraction. The remaining cold-water soluble fraction may be consumed or, for example, concentrated and dried to powder form. Pursuant to such practices, however, the insoluble fraction is discarded, thus leading to a substantial loss of normal, flavorful tea component.

One method for avoiding this loss is set forth in U.S. Pat. No. 3,163,539 of Barch. In accordance with the disclosure of this patent, the normally cold-water insoluble tannin fraction of an aqueous tea extract is separated by chilling the extract until precipitation occurs. The precipitate of tannins is then subjected to oxidation under highly basic condition sufficient to improve its solubility. Thereafter the tannin fraction is acidified to return it to normal pH and may be recombined with the other fraction of the original extract.

Among the problems incident to the foregoing cold-water solubilization of tannin, is a requirement that the tannin fraction need be in a highly basic medium to undergo oxidative solubilization. Substantial amounts of alkali or other base must be added to the medium (which by virtue of its tannin content would ordinarily be acidic) in order for the reaction to proceed satisfactorily. This added alkali is not easily separated from the oxidized tannins and therefore may eventually constitute an impurity of any ultimate tea product. Additionally, the reacidification of the medium often necessary after oxidation may further increase the concentration of foreign ingredients in the final beverage product.

DESCRIPTION OF THE INVENTION

This invention relates to a means for improving prior art processes for rendering tea tannins cold-water soluble. More particularly, it has been discovered that tannins can be solubilized under modified oxidation conditions, not requiring the addition of substantial amounts of alkaline and/or acidic agents. This discovery involves the use of an oxidation catalyst to promote the oxidative solubilization of tannins.

In accordance with this invention, hot water extracts of tea are prepared. The extracts contain tannin constituents (insoluble in cold water) as well as other constituents (soluble in both hot and cold water). Such extracts may be prepared by conventional techniques, exemplary of which are multi-stage countercurrent and slurry extractions. Each of these techniques normally involves leaching of green or, preferably, black (fermented) tea leaves with water at a temperature from about 60° to 200° C.

As utilized herein, "hot" or "hot water" refers to a temperature between about 60° to 120° C., whereas "cold" or "cold water" refers to a temperature between about 0° to 15° C.

Depending upon the particular extraction technique employed, the solids concentration of the resultant extract will usually range from about 1% to 10% solids by weight. To simplify processing, however, the hot tea extract may be adjusted to a standard concentration. Ordinarily a standard of from about 5 to 15%, most preferably about 8% total solids by weight, is preferred for this purpose.

These tea extracts additionally contain important flavor constituents which are unusually susceptible to reaction or loss during processing and it is advantageous to minimize their exposure to adverse conditions. The constituents—normally termed "volatiles"—are therefore often temporarily separated to ensure against loss. Even prior to standardization of the concentration of the tea extract, these constituents are desirably isolated by, for example, stripping them from the extract with steam at a temperature of from about 80° to 120° C., collecting the steam laden with volatiles and condensing and cooling them to obtain a stable isolate of these important flavorants. This isolate may be later utilized to reconstitute processed extract into a full flavored beverage product.

The removal of the cold-water insoluble tannin fraction from the extract is also readily performed. This tannin fraction, which normally constitutes from about 15 to 35% of the total tea solids, is conveniently precipitated from solution through chilling to a temperature between about 15° and 0° C., preferably of about 8° to 10° C. Separation of the precipitated tannins from the aqueous supernatant containing soluble tea solids may then be accomplished through various techniques well known in the art, for example, by centrifuging the chilled slurry.

The separated precipitate of insolubles is then desirably washed with water, preferably at a temperature of from 0° to 15° C., most suitably of about 8° to 10° C.

This precipitate ordinarily contains from about 15 to 30% by solids weight of entrained cold-water soluble material. This wash reduces the weight of non-tannin solubles in the precipitate so that they will not be subjected to the subsequent conditions of oxidative solubilization.

The washed insolubles are then dispersed or dissolved in water. Again it is convenient for further processing that the concentration of the tannins be standardized. Consequently, it is preferred that sufficient water be utilized to obtain a medium containing from about 5 to 15% solids, most preferably about 10% by weight of solids.

Dispersion of the raw tannins in water ordinarily results in a medium having a pH of from 4.8 to 5.0. This natural pH is suitable for oxidative solubilization by the catalytic technique of this invention. It may, however, be adjusted—as desired—to permit greater control of the oxidation step.

If the medium is adjusted by substantial acidification, however, the yield of solubilized tannins may be reduced. Consequently, adjustment of the pH of the medium to less than about 4.5 is ordinarily undesirable.

If the medium is adjusted to less acidic pH for the solubilization step, a greater yield of solubilized tannin is obtained. An increase in the pH of the medium, however, requires addition of alkali—normally, for example, sodium or potassium hydroxide. Consequently this increase in yield is achieved only through a corresponding increase in the amounts of reagents used. The pH is therefore ordinarily not raised above about 9.0, and preferably is maintained between about 4.8 and 6.0 for the oxidative solubilization.

Solubilization of the tannins is accomplished by contacting the dispersed tannins with oxygen in the presence of a conventional oxidation catalyst. There then occurs an oxidative reaction—reflected in the concurrent conversion of from about 10 to 15% by weight of tannins into carbon dioxide—which greatly improves the cold-water solubility of these tannins. Moreover, this is accomplished without destroying their important beverage properties.

The amount of oxygen necessary for catalytic solubilization is essentially the same as that required by prior art oxidative techniques. At least 100 liters (S.T.P.), preferably from about 200 to 400 liters, of oxygen per kilogram of tannin solids will permit completion of the reaction. For catalytic oxidation, however, it is desired that the oxygen be under compression. An oxygen partial pressure of from about 5 to 50 kilograms per square centimeter is preferred to accelerate the reaction.

As in prior art oxidation techniques, temperature also affects the rate and degree of reaction. Elevated temperatures increase the rate of oxidation and temperature of at least 80° C. are therefore preferred. Above this temperature, still further increases in the rate of reaction are encountered. Temperatures above 110° C., however, show adverse effects. At these temperatures, some of the tannins may become charred and polymerized, thus making them less water-soluble. The preferred conditions of operation therefore range from 80° to 110° C., with from 100° to 110° C. being the most preferred.

The oxidative solubilization of tannins may be effected with any of the conventional oxidation catalysts known in the art. These catalysts, which include $MnO_2$, $Co_3O_4$, $CuO$, $V_2O_5$, $CuCO_3$, $NiO$, $Cr_2O_3$, $Ag$ and mixtures thereof, promote the oxidative solubilization. They increase both the rate and yield of reaction, an increase which is particularly pronounced at the relatively mild conditions under which they are preferably employed.

With certain of these catalysts, minor undesirable side effects may occur. Thus, for example, some of these catalysts—especially $V_2O_5$ and $Ag$—may produce excessive amounts of acid. The use of cobalt and copper catalysts, on the other hand, may give rise to a slight metallic or off-flavor. Manganese dioxide, however, is essentially free of such defects and also is very active. It is, therefore, a particularly preferred catalyst.

In accordance with this invention, the catalyst may be provided on an essentially inert support. This facilitates handling of the catalyst. Such supports are known in the art and generally include materials such as alumina, silica, silicon carbide and the like. Where employed in this form, the active catalyst is ordinarily present in from 1 to 10% by weight of the support.

The amount of catalyst also affects the rate of oxidative solubilization. This is true even where agitation of the medium during reaction is performed to insure free and ready contact between the catalyst, oxygen and unoxidized tannin. It is therefore preferred that from 0.1 to 1% of active catalyst by weight of tannin solids be utilized to facilitate reaction. Catalyst in excess of this amount does not appear to provide any substantial advantage.

During the oxidation reaction, it has been discovered that the cold-water solubility of the tannins being oxidized reaches a maximum. The point at which this maximum occurs varies, dependent upon the particular conditions utilized. In all cases, however, the tannins first increase in solubility with continued exposure to oxidation conditions and then become progressively less soluble.

Simple monitoring of the medium during reaction, however, permits determination of the optimum time of oxidative exposure. This monitoring may be performed by periodic testing of the solubility of aliquots of the tannins. When the maximum has been reached, the reaction may be stopped.

An alternative means of monitoring the reaction relies upon changes in the pH of the medium. Solubilization of the tannins coincidentally results in the production of free acids. Sufficient acid is ordinarily produced to cause an acidification equal to at least 0.5, preferably from 0.5 to 1.5, pH units. The lowering in pH resultant from this production of acid both marks and limits the progress of the oxidation reaction. The reaction is desirably stopped where the pH of the medium reaches a point between 3.0 and 4.0, depending upon the particular catalyst and conditions employed. This ensures that the solubility of the tannins will be at its maximum.

This limitative effect of pH on solubilization is responsible for the previously described greater yields of solubilized tannin achieved when the initial pH of the solution is raised by addition of alkali. Greater amounts of by-product acid must then be produced before the pH of the medium is reduced to a point sufficient to cause the reaction to cease. Thus, modification of the pH of the tannin medium permits control of the degree of solubilization.

In an alternative embodiment, greater yields of solubilized tannins may be achieved by removal or neutralization of by-product acids during the oxidative solubilization. Neutralization is most easily performed by addition of aliquots of alkali during the reaction. In this manner a desirable pH of, for example, between about 4.5 and 5.5 may be maintained for the reaction.

More preferably, however, the acids formed during solubilization are removed by a solid absorbent or like means. Thus, for example, an acid scavenger such as an anion exchange resin may be contacted with the medium. This contact may, for example, be achieved by placing the absorbent in the reaction chamber with the catalyst or, preferably, by continuously recirculating the tannin medium between two chambers, a reaction chamber containing catalyst and a second chamber containing absorbent. The absorbent buffers the pH by removing acid and so permits higher degrees of solubilization. After the reaction is complete, the tannin medium is readily separated and remains unadulterated.

A still further increase in the effectiveness of catalytic oxidation may be achieved through incorporation of a reaction promoter into the medium during oxidation. For example, sulfur dioxide—ordinarily in the form of dilute sulfuric acid—may be added to the medium in a manner set forth in the U.S. Pat. No. 2,831,772 of Herz or U.S. Pat. No. 3,065,077 of Mishkin. Such a sulfite promoter, acting together with the catalytic oxidation mechanism, will increase the yield and rate of the solubilization reaction.

Ordinarily, however, such promoters are not employed in the practice of this invention. It is preferred to avoid the added expense and handling difficulties arising from their use. Additionally, because they may become incorporated into the eventual product, promotion of the reaction is more preferably performed by other means already described.

In performing the present catalytic oxidation, solubilization is ordinarily performed by batch operation. Continuous or semi-continuous processing in, for example, a suitable column packed with catalyst may also be employed. Selection of the most advantageous approach to oxidation is largely dependent upon the amounts of tannin to be solubilized and may readily be determined within the ordinary skill in the art.

The tannins being oxidized are preferably ones freshly extracted from tea. Once extracted, tannins tend to degrade and to lose their ability to be solubilized. They can, however, be stabilized. Thus, for example, if processing conditions require that extracted, raw tannins be held for more than about 24 hours, they may be dehydrated—as by freeze-drying. Although dehydration will reduce by between 5 to 15% the solubilizable weight of tannin, it ensures against any greater loss by degradation.

It is desired that the tannin medium be agitated during reaction. Suitable for obtaining such agitation are the well-known mechanical means and flow regulatory techniques. This agitation ensures intimate contact between the reagents and catalysts. It therefore shortens the time and insures the uniformity of solubilization.

After reaction, the solubilized or oxidized tannins of this invention are ordinarily somewhat darkened in color as compared to native or unoxidized tannins. Before these oxidized tannins are incorporated into a product suitable for beverage use, they are therefore preferably lightened as is known in the art. This additional step insures that beverage products containing the solubilized tannins will correspond in color and appearance with conventional products.

One method for restoring a natural color to the oxidized tannins is set forth in U.S. Pat. No. 3,151,985 of Fobes. According to the patent—the disclosure of which is incorporated herein by reference—a bleaching agent such as hydrogen peroxide is added to the solubilized tannins to achieve this objective.

Another means of restoration of natural tannin color is disclosed in U.S. application Ser. No. 477,601 filed June 10, 1974 in the name of Rupert J. Gasser et al and entitled "Process For Preparing Soluble Tea Product". This application, now U.S. Pat. No. 3,950,553,—the disclosure of which is incorporated herein by reference—describes the discovery that oxidized tannins may be lightened or decolorized by contact with unoxidized tannins. It is preferred because it does not involve the use of any constituents nor normally occuring in tea.

As described therein, oxidized and unoxidized tannins are combined in approximately equivalent or equimolar amounts in an aqueous medium. This intimate contact—preferably at a temperature of 50° to 90° C. and pH of 5.0 to 8.0—quickly causes the oxidized tannins to return to their original color. The unoxidized tannins on the other hand appear unaffected and thus may be precipitated by chilling for separation from the solution of lightened, cold-water soluble tannins.

In a further preferred embodiment, an aqueous extract of tea may be utilized both to decolorize oxidized tannins and to combine them with a normal complement of non-tannin tea solids. By combining a tea extract (containing unoxidized tannins) with oxidized tannins, the latter tannins are decolorized. The unoxidized tea tannins may then be precipitated by chilling. This permits their removal—for separate processing, preferably including solubilization—while also yielding a new extract of normal tea composition but containing oxidatively solubilized tannins.

Once the oxidized tannins have been combined with the other, normally completely soluble tea solids, the resultant extract may be subjected to further conventional processing. Thus, for example, it may be concentrated, recombined with previously isolated volatiles and dried to produce "instant" tea products by known techniques. In this manner, tea products having properties and characteristics virtually identical to those of a naturally occurring tea (except for the desirable cold-water solubility characteristics achieved in accordance with this invention) are produced.

The following examples are illustrative of this invention. Proportions are given on the basis of parts by weight unless otherwise specified. The yield or percent solubilization is expressed as the weight ratio of cold-water soluble solids after oxidation to initial solids in the reaction media.

EXAMPLE 1

2 liters of 4% aqueous tea extract are stripped of volatiles with 4% by weight of steam at a temperature of 100° C. The volatiles are condensed and cooled to yield a stable isolate for subsequent reincorporation into the eventual tea product. The extract is then subjected to vacuum evaporation to obtain a solids content of 10% by weight.

The concentrated extract is cooled to a temperature of 10° C. and centrifuged. 24 grams of raw tannin solids are thereby separated from the extract. These solids are dispersed in 400 grams of water and the resultant dispersion is observed to have a pH of 4.95.

The tannin suspension is added to a 2 liter pressure reaction apparatus equipped with an electrical heating jacket, agitator and gas exhaust. The apparatus also contains 5.5 grams of manganese dioxide on a silicon carbide support (the total weight of active manganese dioxide being 0.25 grams).

The apparatus is brought to an oxygen partial pressure of 10 kg/cm² and a temperature of 100° C. These conditions, and an agitator speed of 500 rpm, are maintained for 15 minutes to effect oxidative solubilization. Thereafter, the tannin solution is removed from the apparatus and permitted to cool to 10° C. At this temperature, a minor amount of solids is observed to precipitate. The remaining extract solution is separated and found to contain approximately 74% of the initial tannins. The solution is slightly darkened in color and has a pH of 4.5.

This solution of oxidized tannins is then added to 2 liters of 4% tea extract (stripped of volatiles and containing raw tannins). The mixture is maintained under agitation at a temperature of 70° C. for 20 minutes. During this time, the solution is observed to lighten to the color customarily associated with unoxidized tannins. It is then cooled to 10° C. and centrifuged, thus removing 24 grams of unoxidized tea tannin solids.

The supernatant tea extract—now containing cold-water soluble, oxidized tannins—is subjected to vacuum evaporation until it reaches a solids concentration of about 45%. To this highly concentrated extract is added the previously separated volatiles isolate and the resultant solution is then spray dried to obtain an "instant" tea product.

This tea product is similar in color and appearance to ones commercially available. Upon addition to cold water to prepare an iced tea drink, however, it dissolves readily to yield a clear, sparkling appearance. In both color and taste, this beverage is virtually indistinguishable from conventional tea products.

EXAMPLE 2

50 grams aliquots of freeze-dried raw tannins redispersed in 1 liter of water are solubilized by the technique set forth in Example 1. The conditions and results of these catalytic oxidations are as follows:

| Catalyst | O₂-Pressure | Temperature | Time | Final pH | % Solubilization |
|---|---|---|---|---|---|
| 4 g. $MnO_2/Al_2O_3$ | 15 kg/cm² | 105° C. | 120 min. | 4.0 | 69% |
| 4 g. $V_2O_5/SiO_2Al_2O_3$ | 24 kg/cm² | 105° C. | 120 min. | 3.3 | 69% |
| 6 g. $Ag/Al_2O_3$ | 23 kg/cm² | 105° C. | 90 min. | 3.3 | 65% |
| 6 g. $Co_3O_4/SiO_2$ | 21 kg/cm² | 100° C. | 16 min. | 3.8 | 55% |
| 10 g. $CuCO_3/SiO_2$ | 21 kg/cm² | 100° C. | 15 min. | 4.0 | 54% |

EXAMPLE 3

Copper carbonate catalyst supported on silicon dioxide (6% of active catalyst) is utilized for solubilization of 50 grams aliquots of freeze-dried raw tannins redispersed in 1 liter of water. Utilizing the technique of Example 1, catalytic oxidation is performed using 10 grams of supported catalyst. Two runs, in only one of which 1.7% of sulfur dioxide promoter (added as an aqueous sulfurous acid) is incorporated into the tannin medium prior to oxidation, are made to compare the efficiencies of solubilization.

The results are as follows:

| O₂-pressure | Temperature | Time | Final pH | % Solubilization |
|---|---|---|---|---|
| (without SO₂) | | | | |
| 23 kg/cm² | 100° C. | 15 min. | 4.0 | 54% |
| (with SO₂) | | | | |
| 23 kg/cm² | 100° C. | 11 min. | 3.8 | 56% |

Thus even with a shorter time of reaction, promoter results in an increased yield of solubilized tannins.

EXAMPLE 4

A 50 gram aliquot of freeze-dried raw tannins redispersed in 1 liter of water is oxidized as set forth in Example 1 using 3 grams of the supported manganese dioxide catalyst. In addition, however, 100 ml of weak ion exchange resin in hydroxyl form (Amberlite IRA-93) is also placed in the reaction apparatus.

The results of this catalytic oxidation are as follows:

| Initial pH | Final pH | O₂-Pressure | Temperature | Time | % Solubilization |
|---|---|---|---|---|---|
| 5.5 | 4.9 | 13 kg/cm² | 100° C. | 120 min. | 79% |

Cooling of the medium to 10° C. after reaction results in no apparent precipitation of cold-water insolubles. All the tannins which remain dissolved are cold-water solubilized. Their difference from the weight of initial tannins reflects production of exhausted $CO_2$ and of acids absorbed by the resin.

What is claimed is:

1. A process for producing a soluble tea product comprising:
   (a) chilling a hot water extract of fermented black tea leaves to a temperature sufficient to precipitate cold water insoluble tannins therefrom and separating the precipitated tannins from the supernatant;
   (b) subjecting the cold water insoluble tannins precipitate to a water washing operation to remove any cold-water soluble material entrained therein;
   (c) forming a dispersion of said cold water insoluble tannins in aqueous medium wherein the dispersion has a pH of between about 4.5 to 6.0;
   (d) contacting said dispersion containing tannins with oxygen and inorganic oxidation catalyst to effect oxidative solubilization of said tannins and coincidently produce free acids; and
   (e) separating the resultant aqueous medium containing solubilized tannins from said catalyst.

2. The process of claim 1, wherein the oxidation catalyst is selected from the group consisting of $MnO_2$, $Co_3O_4$, $CuO$, $V_2O_5$, $CuCO_3$, $NiO$, $Cr_2O_3$, $Ag$ and mixtures thereof.

3. The process of claim 2, wherein the oxidation catalyst is provided on an inert support.

4. The process of claim 3, wherein the oxidation catalyst is $MnO_2$.

5. The process of claim 1, wherein oxidative solubilization occurs at a temperature of from 80° C. to 110° C.

6. The process of claim 1, wherein at least a portion of the acids formed during solubilization of the tannins are removed or neutralized during oxidation.

7. The process of claim 1, wherein the separated aqueous medium containing solubilized tannins has a pH between 3.0 and 4.0.

8. The process of claim 1, wherein the separated aqueous medium containing solubilized tannins is decolorized with cold water insoluble tannins and said cold water insoluble tannins are then separated from said medium.

* * * * *

UNITED STATES PATENT AND TRADEMARK OFFICE
CERTIFICATE OF CORRECTION

PATENT NO. : 4,156,024
DATED : May 22, 1979
INVENTOR(S) : Saeed Husaini

It is certified that error appears in the above-identified patent and that said Letters Patent are hereby corrected as shown below:

At Col. 6, line 13, "occuring" should read -- occurring --.

In the Table set forth at Col. 7, under the heading "Catalyst" the second entry "4 g. $V_2O_5/SiO_2Al_2O_3$" should read -- 4 g. $V_2O_5/SiO_2-Al_2O_3$ --.

Signed and Sealed this

Thirteenth Day of January 1981

[SEAL]

Attest:

SIDNEY A. DIAMOND

Attesting Officer

Commissioner of Patents and Trademarks